United States Patent [19]

Dinsdale

[11] 4,291,566
[45] Sep. 29, 1981

[54] METHOD OF AND APPARATUS FOR FORGING METAL

[75] Inventor: Raymond Dinsdale, Colne, England

[73] Assignee: Rolls-Royce Limited, London, England

[21] Appl. No.: 73,875

[22] Filed: Sep. 10, 1979

[30] Foreign Application Priority Data

Sep. 16, 1978 [GB] United Kingdom ............... 37111/78

[51] Int. Cl.³ ............................................... B21K 3/04
[52] U.S. Cl. .................. 72/342; 29/156.8 B; 29/402.21
[58] Field of Search ............... 29/156.8 B, 402.19, 29/402.21, DIG. 24, DIG. 45; 72/38, 342

[56] References Cited

U.S. PATENT DOCUMENTS

| | | | |
|---|---|---|---|
| 2,741,469 | 4/1956 | Wallerus | 432/226 |
| 2,760,543 | 8/1956 | Wood | 72/342 |
| 3,461,709 | 8/1969 | McMillen | 72/342 |
| 4,095,451 | 6/1978 | Watton | 29/156.8 B |

FOREIGN PATENT DOCUMENTS

| | | | |
|---|---|---|---|
| 699687 | 11/1953 | United Kingdom | 29/156.8 B |
| 991392 | 5/1963 | United Kingdom | 72/342 |

*Primary Examiner*—Lowell A. Larson
*Attorney, Agent, or Firm*—Cushman, Darby & Cushman

[57] ABSTRACT

A worn titanium blade for a gas turbine engine has metal displaced at its aerofoil tip, so that the aerofoil can be dressed to restore it to length. The titanium is not amenable to cold forging, or to being entirely heated, a forge is therefore provided which has dies which contact only the immediate area containing the metal to be displaced. The dies are heatable so as to heat the said area by conduction and powered so as to apply suitable pressure in a way which brings about isothermal displacement of the titanium.

10 Claims, 4 Drawing Figures

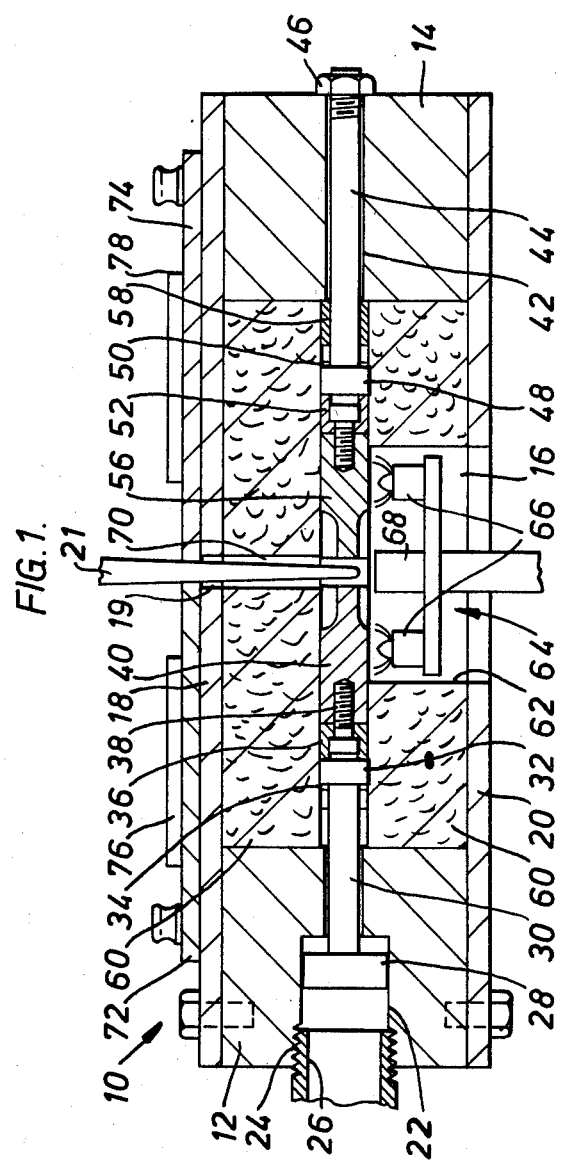
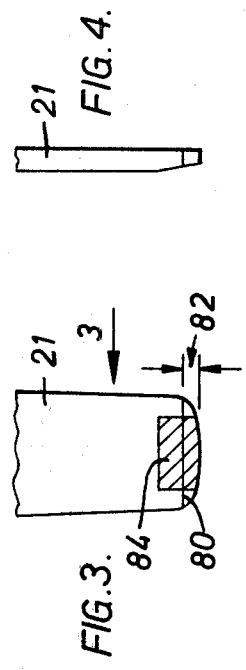

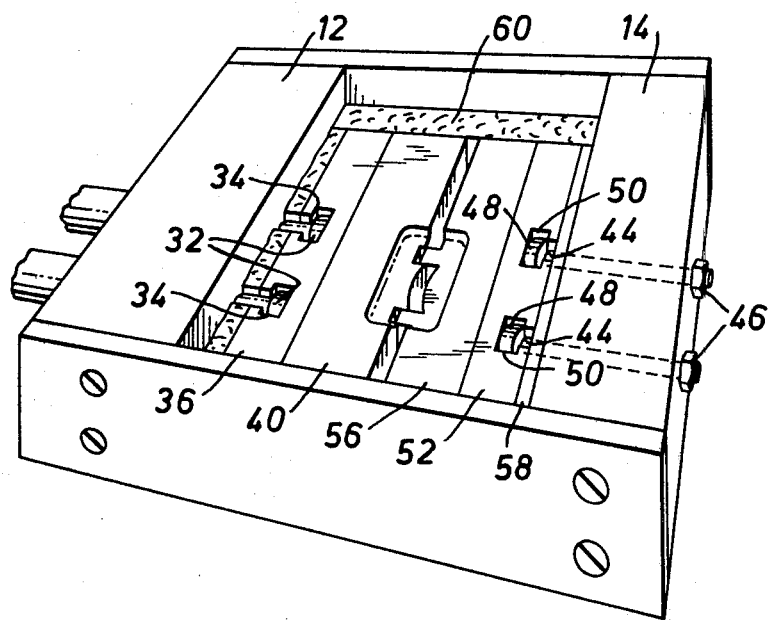

METHOD OF AND APPARATUS FOR FORGING METAL

This invention relates to a method of and apparatus for forging metal.

Metal, including Titanium, is used in the manufacture of compressor blades. The compressor blades are then assembled to form a compressor for a gas turbine engine. On rotation of the compressor during operation of the engine, the blades move radially outwards under centrifugal force, with the result that the blade tips contact the inner surface of the compressor casing and wear away. It follows that air spills off the blade tips and the compressor efficiency is considerably reduced.

It is desirable to reform the blade tips, so as to avoid having to scrap the blades. However, it has been discovered that heating an entire blade merely to enable reforming its tip, adversely affected other characteristics of the material from which the blade was made.

The present invention seeks to provide a method of heating a metal blade for a gas turbine engine so as to enable forging only a portion thereof without damaging the remainder of the blade. Moreover the invention seeks to provide both a method of forging only a portion of a blade for a gas turbine engine and, apparatus with which to perform the partial forging operation.

According to the present invention, there is provided a method of heating a metal blade for a gas turbine engine so as to enable only a portion thereof to be forged, including the steps of heating the dies of the forge to the forging temperature of the blade metal, inserting that part of the blade to be forged between the dies and clamping it therein, and delaying the forging action until the clamped portion of metal has reached said forging temperature by extracting heat from the dies.

The invention further provides a method of hot forging only a portion of a blade for a gas turbine engine, including the steps of heating the dies of the forge to the forging temperature of the blade metal, inserting that part of the blade to be forged between the dies and clamping it therein, delaying the forging action until the clamped portion of metal has reached forging temperature by extracting heat from the dies and then operating the dies to displace the blade metal as desired.

Preferably, the forging operation is performed isothermally.

The invention also provides apparatus for hot forging only a portion of a blade for a gas turbine engine and said apparatus comprises a pair of cooperating dies, heating means for heating the dies, means for moving said dies for clamping and forging a blade portion and removable shield means for shielding the remainder of a said blade from radiated heat during use of the apparatus.

The die heating means may comprise a gas burner. Alternatively the heating may be achieved electrically. Preferably the dies are encased in a low thermal conductivity material.

The low thermal conductively material may be a ceramic.

The ceramic may be in the form of cast blocks arranged adjacent the dies.

The invention will now be described, by way of example and with reference to the accompanying drawings in which:

FIG. 1 is a longitudinal cross sectional view of apparatus in accordance with an embodiment of the invention, FIG. 2 is a pictorial view of the apparatus of FIG. 1, FIG. 3 is a part view of a compressor blade which has been forged in accordance with an embodiment of the invention, FIG. 4 is a view on arrow 4 in FIG. 3.

In FIG. 1 a steel box 10 is constructed from opposing end pieces 12, 14 of substantial proportions, side pieces 16 of which only one is shown and top cover 18 and bottom cover 20. Top cover 18 has an aperture 19 through which a blade aerofoil 21 is inserted for forging.

End piece 12 is drilled in two places, only one, 22 being shown, to provide a pair of cylinders. The outer ends 24 of the cylinders are screw threaded to facilitate the allocating of a delivery nozzle 26 of a high pressure fluid line (not shown).

Prior to fitting nozzle 26, pistons 28 are slid into respective cylinders 22. Each piston 28 has a shank 30 terminating in a square head 32. Each square head 32 fits in a "T" slot 34 formed in a rigid steel bar 36, which in turn is fastened by screws 38 to a half die 40. The "T" slots 34 are seen more clearly in FIG. 2.

End piece 14 is drilled at 42, to take a pair of studs, of which only one, 44 is shown. Stud 44 is screwed at its outer end and a nut 46 is fitted thereto. The inner end of each stud 44 terminates in a square head 48 which fits into respective "T" slots 50 formed in a rigid steel bar 52. Again "T" slots 50 are best seen in FIG. 2.

Rigid bar 52 is fastened by screws 54 to a further half die 56. A spacer piece 58 enables the positioning of further half dies 56 within box 10 and then nuts 46 are tigntened, so that the bar 52 is held rigid between the square stud heads 48 and nuts 46.

The spaces within box 10, around the die halves 40, 56 and the respective inner ends of shanks 30 and studs 44, are packed with solid blocks of heat insulation material 60. The heat insulation material in the present example is cast ceramic.

The lower ceramic block 60 has a hole 62 formed in it, and the head 64 of a gas burner is inserted. The burner head 64 has a number of nozzles 66 around its periphery and these nozzles each direct a gas flame onto the die halves 40, 56. A shield 68 prevents the flames encroaching on the tip of blade aerofoil 21.

The upper ceramic block 60 has a hole 70 in it to permit passage of blade aerofoil 21 to the forging position.

The apparatus is completed by a pair of shutters 72, 74 which are arranged to slide in respective runners 76, 78 on top cover 18 and in the closed position, engage with a blade aerofoil 21.

In FIG. 2, the shutters 76, 78, top cover 18 and upper ceramic block 60 have been removed. As a result, the square heads 32 of pistons 28 can be seen resting in "T" slots 3 of bar 36 and the square heads 48 of studs 44 can be seen resting in "T" slots 50 of bar 52, behind which is packing bar 58. The two die halves 40, 56 are also clearly seen in FIG. 2.

In operation, the gas heater 64 heats the die halves 40, 56 to the forging temperature of the material from which blade aerofoil 21 is made. When the die halves 40, 56 reach that temperature, the blade aerofoil 21 is inserted and the die halves 40, 56 clamped onto the blade aerofoil 21 with sufficient pressure to hold it. Pressure, is applied by admitting high pressure air to cylinder 22, forcing piston 28 to the right as viewed in FIG. 1 and thus moving die half 40 towards die half 56 to achieve the clamping.

Clamping of the blade aerofoil 21 is maintained, until heat transferred by conduction from the die halves 40, 56, to the blade aerofoil end portion, has raised the blade aerofoil end portion to the forging temperature of its material whereupon, pressure on the piston 28 is increased, so as to bring about displacement of the blade aerofoil metal. The result is that the blade aerofoil 21 becomes elongated by an amount sufficient to permit dressing and re-machining to its design length.

In the present example, the blade aerofoil material is Titanium and the material of each die half is a nickel based alloy. Experiment showed that the blade aerofoil material could be satisfactorily displaced at a temperature of 800° C. and that it initially takes approximately one hour for the die halves 40, 56 to reach that temperature on being heated by the gas flame. It takes the end portion of blade aerofoil 21 approximately one minute to reach the same temperature on being conduction heated from the die halves 40, 56. The actual time is governed by the magnitude of the blade tip proportions. The clamping force is then increased such that a load of e.g. ten tons (or ten thousand, one hundred and sixty kilogrammes) is applied to the blade end portion and held for one further minute, whereafter the load is removed and the blade aerofoil 21 taken from the forge. Such a method i.e. the maintaining of pressure for a period of time, is known as isothermal forging.

In FIG. 3, line 80 depicts the tip of blade aerofoil 21 before forging. The distance between arrow heads 82 indicates diagrammatically, the amount of elongation of the blade aerofoil 21, achieved by forging in accordance with the present invention, and the shaded portion 84 indicates the area of contact made between die half 40 and the flank of blade aerofoil 21.

In FIG. 4, the distance between arrow heads diagrammatically indicates the thinning of the blade aerofoil 21 at its tip as a result of the forging operation described herein.

I claim:

1. A method of heating only an extremity of a blade for a gas turbine engine made from a titanium material and then reforming the extremity including the steps of:
   heating cooperating movable dies of a forge to a forging temperature for the titanium material of the blade;
   then inserting the extremity of the blade through a close fitting heat shield to a position where only the extremity of the blade to be reformed is between the heated dies with the remainder of the blade being external of the heat shield;
   applying a first pressure by the heated cooperating dies on the extremity of the blade to clamp the same therebetween and maintaining the clamping pressure of the dies on the extremity of the blade until heat is transferred from the dies only to the extremity of the blade and raises the temperature of the extremity of the blade to the forging temperature of the titanium material; and
   after forging temperature for the titanium material of the blade has been reached in the extremity of the blade, then increasing pressure of the cooperating dies on the extremity of the blade to a forging pressure sufficient to achieve displacement of material at the extremity of the blade.

2. A method of hot forging a titanium blade as claimed in claim 1 wherein the forging operation is performed isothermally.

3. A method as claimed in claim 1 in which clamping pressure of the dies holding the extremity of the blade is maintained for approximately one minute.

4. A method as claimed in claims 1 or 3 in which forging pressure of the dies on the extremity of the blade is maintained for approximately one minute.

5. A method as claimed in claim 4 in which the forging pressure of the dies on the extremity of the blade is in the order of about ten tons.

6. An apparatus for hot forging only an extremity of a blade for a gas turbine engine made from a titanium material to reform the same, said apparatus comprising:
   a pair of cooperating dies movable toward one another;
   heating means for heating said dies to a temperature sufficient to forge the titanium material of the blade;
   a heat shield including an aperture therein through which the extremity of the blade to be reworked can pass, said aperture closely fitting about the blade with the extremity of the blade being between said dies and the remainder of the blade being external of said heat shield; and
   means for moving said cooperating dies into engagement with the extremity of the blade to apply an initial clamping pressure about the extremity of the blade to permit only the extremity of the blade to be heated to the forging temperature of the titanium material by heat extracted only from said dies, said means, after the extremity of the blade has been heated, applying a second pressure by the dies to the extremity of the blade sufficient for forging the extremity of the blade to reform the same.

7. An apparatus as claimed in claim 6 wherein said heat shield encases said dies and is made of a low thermal conductivity material.

8. Apparatus as claimed in claim 7 wherein the low thermal conductively material is a ceramic.

9. Apparatus as claimed in claim 7 wherein the ceramic is in the form of cast blocks arranged adjacent the dies.

10. Apparatus as claimed in claim 6 comprising a gas burner positioned so as to direct a flame on to said dies.

* * * * *